Jan. 24, 1967  C. W. MacMULLEN  3,299,566
WATER SOLUBLE FILM CONTAINING AGRICULTURAL CHEMICALS
Filed June 1, 1964

INVENTOR.
CLINTON W. MacMULLEN
BY
ATTORNEY

· # United States Patent Office 3,299,566
Patented Jan. 24, 1967

3,299,566
WATER SOLUBLE FILM CONTAINING
AGRICULTURAL CHEMICALS
Clinton W. MacMullen, Hamden, Conn., assignor to Olin Mathieson Chemical Corporation, a corporation of Virginia
Filed June 1, 1964, Ser. No. 371,710
1 Claim. (Cl. 47—1)

The present invention relates to water soluble films including a method of manufacture.

The invention also relates to a method of treating selected areas of the surface of the earth with a chemical agent.

A particular feature of the invention is the provision of a water soluble film or web having incorporated therein a uniformly dispersed chemical agent such as a fertilizer, insecticide, fungicide, herbicide, or other pesticide, repellent, attractant, defoliament or plant growth regulator.

Some embodiments of the invention may include a surface active agent effective to increase the rate of solution of the film and effective to aid in spreading the chemical agent over the surface of the earth including plants or other vegetation growing thereon.

Other embodiments of the film of the present invention may include dyes or pigments useful to identify the kind of chemical agent (for example, fertilizer or insecticide) contained in the film.

The invention also features a novel method of preparing a water soluble film incorporating a chemical agent.

A further feature of the present invention is the provision of a novel process for treating selected areas of the earth's surface, such as a lawn or a garden, with a chemical agent.

An advantage of the invention is the provision of a method of applying chemicals conveniently and evenly to a soil surface in an exact dosage, as for example when it is desired to kill weeds or insects or to fertilize a lawn.

A water soluble film or web embracing certain features of the present invention may comprise a uniformly dispersed chemical agent supported or carried by a water soluble binder.

A process for producing said water soluble film and embracing other features of the invention may comprise the steps of mixing or blending a water soluble chemical agent with a water soluble binder, forming the mixture into a web or sheet, perforating the sheet to provide air passages through the sheet and winding the sheet upon a mandrel.

A process for treating the surface of the earth with a chemical agent may comprise the steps of disposing upon selected areas of the surface of the earth a perforated water soluble film or sheet embracing a uniform dispersion of a chemical agent, applying moisture to the sheet in sufficient quantities to dissolve the sheet effective to release the chemical agent.

Figure 1:
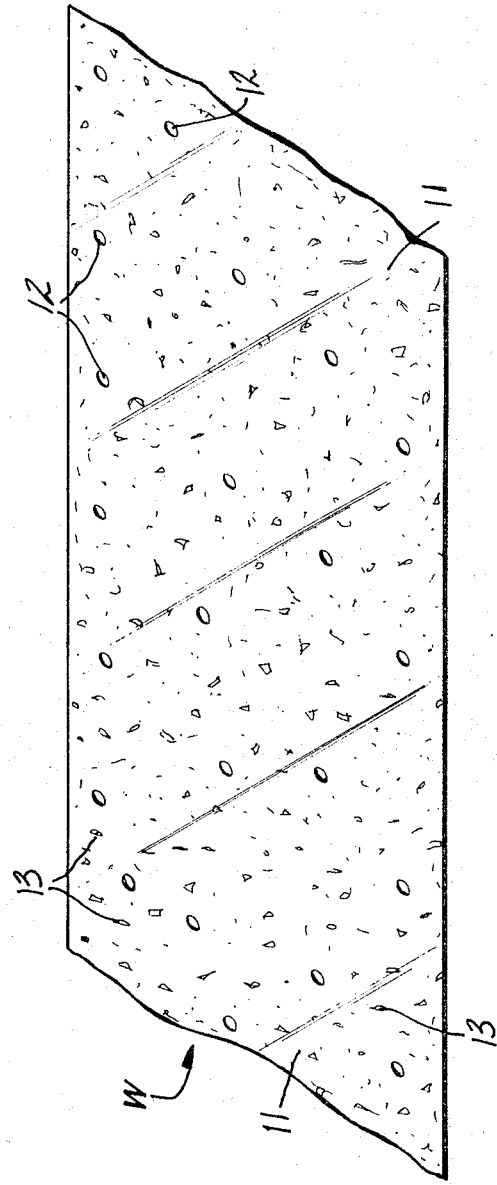
Figure 2:
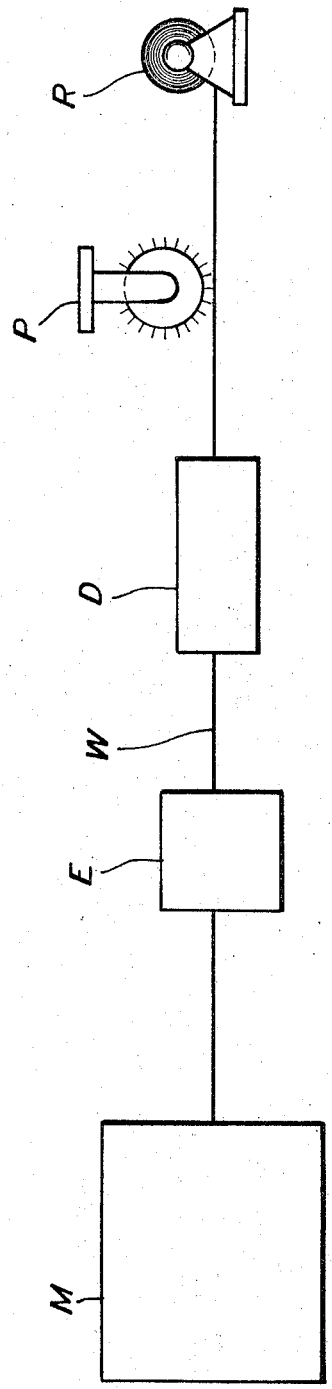

Other features and advantages of the present invention will become more apparent from a study of the succeeding specification when read in conjunction with the appended drawings in which:

FIG. 1 is a plan view, somewhat enlarged, of a fragment of film illustrating the principles of the invention, and, FIG. 2 shows schematically a sequence of machinery, the operation of which is useful to practice the process steps of the present invention.

Referring now to FIG. 1, there is shown a web or sheet of water-soluble film W comprising a water soluble binder 11 defining starch (amylose), polyvinyl alcohol, polyethylene oxide, methyl cellulose, sodium carboxy methyl cellulose or like materials.

The web W is shown perforated in random fashion with a plurality of holes 12 operative to admit air to the earth's surface in the event the film W is spread over lawn or other vegetation for a substantial interval prior to dissolving.

The reference numeral 13 designates dispersed particles of a chemical agent, such as fertilizer, fungicide, insecticide, etc.

While not essential to the invention, if desired, surface active agents may be included in the film W in order to hasten solution of the binder 11 and to encourage distribution of the chemical agent.

In corresponding fashion a non-essential but useful additional ingredients, namely a dye or pigment, may be included in the film W in order to conveniently identify the particular chemical agent incorporated.

It is anticipated that other additives may be incorporated into or combined with the basic materials (water soluble binder and chemical agent) without departing from the spirit and scope of the invention.

FIG. 2 shows a mixer-blender M for combining the binder and chemical agent plus any additional optional ingredients. The letter E denotes an extruder or calendar mill useful to convert the mixture into a web or sheet W. D represents a drier section while P identifies a perforating station and R represents a take-up stand upon which the finished film is wound or packaged.

The process of treating a selected area of the earth's surface with a chemical agent contemplates unwinding or unrolling a length of film W and disposing it upon the earth, for example, upon a lawn, a garden, or other vegetation, to be treated.

Note that perforations in the film permit free access of air in the event the film is not immediately dissolved. This feature is important when the film is used to treat lawn or other vegetation. Thereafter rain or artificial sprinkling is effective to dissolve the binder 11 releasing the chemical agent into intimate contact with the earth's surface.

Obviously any additional optional ingredients should preferably be of a water soluble character or be finely divided.

As stated earlier, it is desirable to include surface active ingredients such as wetting agents to increase the rate of solution and to encourage spreading the chemical agent.

It is anticipated that a wide variety of embodiments may be devised in the article and the several processes embraced in the present invention without departing from the spirit and scope thereof.

What is claimed is:

A flexible sheet operative by dissolution to release pesticides into the earth's surface comprising a water soluble sheet, said sheet being randomly perforated to admit air to the earth's surface, said sheet being fabricated from material selected from the group consisting of polyvinyl alcohol and polyethylene oxide, said sheet having incorporated therein
 (a) water-soluble dye indicia,
 (b) a water-soluble surface active agent, and
 (c) a pesticide,
said dye indicia, said surface active agent and said pesticide being uniformly dispersed throughout said sheet.

(References on following page)

References Cited by the Examiner

UNITED STATES PATENTS

| | | | |
|---|---|---|---|
| 1,978,102 | 10/1934 | Clapp | 47—1 |
| 2,770,538 | 11/1956 | Vierling. | |
| 2,945,322 | 7/1960 | Gaeth et al. | 47—9 |
| 2,971,292 | 2/1961 | Malecki | 47—58 |

OTHER REFERENCES

Washington Post: April 13, 1947, page 7R.

ABRAHAM G. STONE, *Primary Examiner.*
R. E. BAGWILL, *Assistant Examiner.*